UNITED STATES PATENT OFFICE.

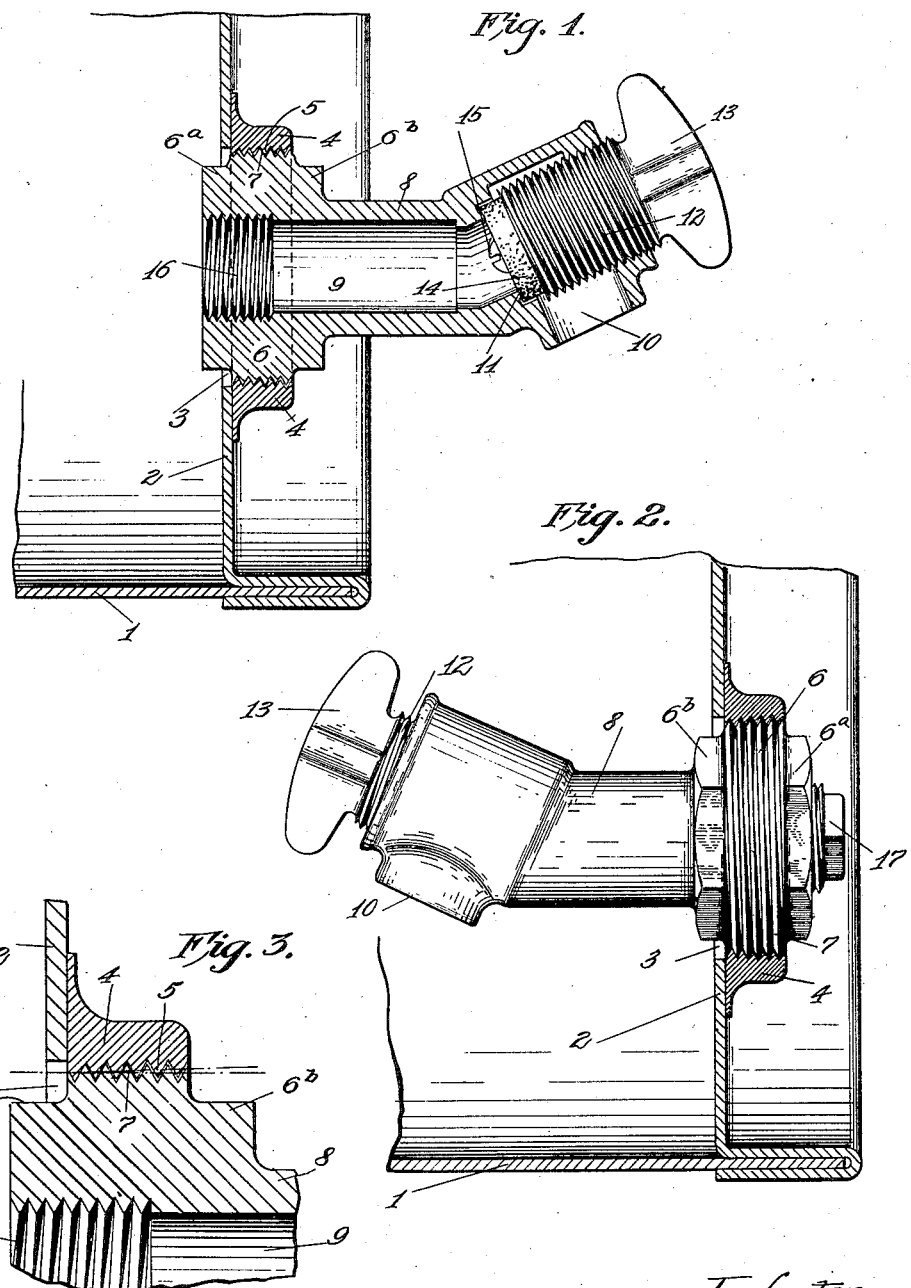

SIDNEY ROSENFELD, OF CLEVELAND, OHIO.

COMBINED BUNG AND FAUCET.

1,205,666.

Specification of Letters Patent.

Patented Nov. 21, 1916.

Application filed June 5, 1914. Serial No. 843,177.

*To all whom it may concern:*

Be it known that I, SIDNEY ROSENFELD, a citizen of the United States, residing at Cleveland, in the county of Cuyahoga and State of Ohio, have invented a certain new and useful Improvement in Combined Bungs and Faucets, of which the following is a full, clear, and exact description, reference being had to the accompanying drawings.

This invention has reference to a combined bung and faucet for barrels, and its object is to provide a device of this character comprising a faucet that is carried by a reversible bung which is of a diameter greater than the greatest cross dimension of the faucet, so that the bung may be screwed into the bung hole of a barrel in a manner to project the faucet into the barrel during shipment or storage, and which may also be reversed to support the faucet in a proper position for use.

My invention is particularly well adapted for use in connection with oil barrels, especially such as are formed of metal, and in such connection I have shown it in the accompanying drawing wherein—

Figure 1 represents a central, vertical section through my improved combined bung and faucet applied to a metal barrel, only a part of the end of such barrel being shown in said figure; Fig. 2 is a view of the same parts, but showing the combined bung and faucet reversed, or in the position they occupy during storage or shipment; and Fig. 3 is an enlarged sectional detail through adjacent portions of the bung and bushing and shows the relative angles of the threaded interior of the bushing and the threaded periphery of the bung.

In the drawings, 1 represents the cylindrical wall of a barrel and 2 the head thereof. Welded or otherwise secured to the outer surface of the head 2, and surrounding the bung-hole 3, is a bushing 4. This bushing is provided with what is known as a tapered thread 5, which means that the threaded aperture of the bushing becomes gradually smaller in diameter as it approaches the inner end, or that end which is adjacent the head of the barrel.

The bung is shown at 6 and has what is known as a straight thread 7 that is adapted to be screwed into the bushing 4, the bung being provided with flat peripheral faces or wrench receiving portions on each side of its threaded portion for the application of a wrench, whereby the bung may be firmly screwed into the bushing. Formed integral with, and projecting from one side of the bung 6 is a faucet 8 having the usual longitudinal bore 9 and a transverse outlet opening 10 that intersects said bore near its outer end, and adjacent to which there is formed a valve seat 11. At its end remote from the bung 6, the faucet is internally threaded for the reception of the threaded valve body 12 that may be rotated by means of the finger grip 13, to cause said valve body to move toward and from the seat 11. A disk 14 of compressible material is secured to the inner end of the valve body by a screw 15 and is arranged to coöperate with the seat 11. Where the bore 9 passes through the bung 6 it is threaded at 16, and a plug 17 may be screwed into the bore to close it against the admission of dirt or dust, during the storage or shipment of the barrel.

Reference has been made to the fact that the bushing 4 has a tapered thread while the bung is provided with one that is straight. The sizes of the parts have been exaggerated in Fig. 3 in order to emphasize this point. By an arrangement of this kind, no positive stop is provided for the bung, thereby allowing the bung to be turned, even after it has become comparatively tight or leak proof, until the faucet stands in a position with its discharge opening directed downward. It can be seen that if the threads on both the bung and the bushing were straight, the plug would have to fit the bushing so loosely in order to permit of a fairly easy turning throughout their respective lengths, that the joint would be liable to leak and the faucet to be accidentally turned. On the other hand, if a shoulder were provided against which the inner end of the bung could seat, then unless the respective threads of the plug and bushing were in absolutely proper relation one to the other, the plug might come to its seat with the faucet in other than upright position. These difficulties are obviated by my straight and tapered thread arrangement.

As I have stated before, during the shipment of the barrel or when the same is in storage, the faucet is contained within the barrel as shown in Fig. 2, and the plug 17 closes the exposed end of the bore 9. When it is desired to use the barrel, a wrench is applied to the wrench receiving portion 6ᵃ of the bung and the bung is unscrewed. The plug 17 is removed, and the combined bung and faucet is reversed and replaced in the bushing 4. By the application of a wrench to the wrench receiving portion $6^b$, the bung may be turned to final position with the outlet openings 10 downward, as shown in Fig. 1.

Having thus described my invention, what I claim is:—

The combination with a container having a threaded opening, of a reversible combined bung and faucet, the bung having a threaded portion that is adapted to be received by said opening, the thread of the opening being tapered and the thread of the bung being straight.

In testimony whereof, I hereunto affix my signature in the presence of two witnesses.

SIDNEY ROSENFELD.

Witnesses:
BRENNAN B. WEST,
HUGH B. McGILL.